United States Patent
Lee et al.

(10) Patent No.: US 9,970,588 B2
(45) Date of Patent: May 15, 2018

(54) GLASS FIBER BOARD COMPRISING INORGANIC BINDER AND METHOD FOR PREPARING THE SAME

(71) Applicant: LG Hausys, Ltd., Seoul (KR)

(72) Inventors: Ju-Hyung Lee, Uiwang-si (KR); Seong-Moon Jung, Daejeon (KR); Myung Lee, Suwon-si (KR); Eun-Joo Kim, Uiwang-si (KR); Hyun-Jae Kim, Seoul (KR)

(73) Assignee: LG HAUSYS, LTD., Seoul (KR)

( * ) Notice: Subject to any disclaimer, the term of this patent is extended or adjusted under 35 U.S.C. 154(b) by 417 days.

(21) Appl. No.: 14/369,910

(22) PCT Filed: Dec. 5, 2012

(86) PCT No.: PCT/KR2012/010461
§ 371 (c)(1),
(2) Date: Jun. 30, 2014

(87) PCT Pub. No.: WO2013/103199
PCT Pub. Date: Jul. 11, 2013

(65) Prior Publication Data
US 2014/0367603 A1    Dec. 18, 2014

(30) Foreign Application Priority Data
Jan. 5, 2012 (KR) .................. 10-2012-0001338

(51) Int. Cl.
| F16L 59/02 | (2006.01) |
| D04H 1/4218 | (2012.01) |
| D04H 1/587 | (2012.01) |
| C04B 28/34 | (2006.01) |
| C03C 25/42 | (2006.01) |
| D04H 1/64 | (2012.01) |
| C04B 14/42 | (2006.01) |
| E04B 1/80 | (2006.01) |
| C04B 111/00 | (2006.01) |
| C04B 111/28 | (2006.01) |

(52) U.S. Cl.
CPC ............ *F16L 59/028* (2013.01); *C03C 25/42* (2013.01); *C04B 14/42* (2013.01); *C04B 28/34* (2013.01); *D04H 1/4218* (2013.01); *D04H 1/587* (2013.01); *D04H 1/64* (2013.01); *C04B 2111/00612* (2013.01); *C04B 2111/28* (2013.01); *E04B 1/803* (2013.01)

(58) Field of Classification Search
USPC ............ 252/62; 427/369–379; 428/357, 366, 428/198; 442/72, 178
See application file for complete search history.

(56) References Cited

U.S. PATENT DOCUMENTS

| 2,405,884 | A |   | 8/1946 | Greger |
| 2,444,347 | A |   | 6/1948 | Greger et al. |
| 4,659,610 | A | * | 4/1987 | George ................. C04B 28/34 |
|           |   |   |        | 428/198 |
| 5,223,336 | A |   | 6/1993 | Griffith et al. |
| 5,496,529 | A | * | 3/1996 | Fogel ..................... C01B 25/36 |
|           |   |   |        | 423/305 |
| 5,503,920 | A |   | 4/1996 | Alkire et al. |
| 5,604,024 | A | * | 2/1997 | von Bonin ............. C04B 12/00 |
|           |   |   |        | 252/606 |
| 2007/0017625 | A1 | * | 1/2007 | Otaki ........................ B32B 5/02 |
|           |   |   |        | 156/148 |
| 2011/0163044 | A1 |   | 7/2011 | Han et al. |
| 2011/0248420 | A1 |   | 10/2011 | Cordts et al. |
| 2011/0305617 | A1 |   | 12/2011 | Lee et al. |

FOREIGN PATENT DOCUMENTS

| CA | 2602892 A1 | 9/1992 |
| CN | 102093062 A | 6/2011 |
| EP | 0539342 A1 | 4/1993 |
| EP | 2607073 A2 | 6/2013 |
| JP | 381985 A | 4/1991 |
| JP | 05331297 A | 12/1993 |
| JP | 9241583 A | 9/1997 |
| JP | 11335183 A | 12/1999 |
| JP | 2001233680 A | 8/2001 |
| JP | 2003113565 A | 4/2003 |
| JP | 2004245258 A | 9/2004 |
| JP | 2005-24107 A | 1/2005 |
| JP | 2009046374 A | 3/2009 |
| JP | 2009106931 A | 5/2009 |

(Continued)

OTHER PUBLICATIONS

Japanese Office Action corresponding to Japanese Application No. 2014549966 dated Jul. 28, 2015.
Database WPI Week 197418 Thomson Scientific, London, GB, 1 page.
Extended European Search Report corresponding to Application No. 12864292.3 dated Aug. 10, 2015.
Chinese Office Action corresponding to Chinese Application No. 201280066151.6 dated Oct. 23, 2015.
Chinese Office Action dated Feb. 28, 2015.

(Continued)

*Primary Examiner* — Lynda Salvatore
(74) *Attorney, Agent, or Firm* — Hauptman Ham, LLP

(57) ABSTRACT

The present invention provides a glass fiber board comprising a glass fiber and an inorganic binder, wherein the inorganic binder comprises an aluminum phosphate.
The present invention provides a method for preparing the glass fiber board comprising (a) preparing an inorganic binder solution comprising an aluminum phosphate (b) applying the inorganic binder solution comprising the aluminum phosphate to a glass fiber; (c) compressing the glass fiber to which the inorganic binder solution comprising the aluminum phosphate is applied; and (d) drying the compressed glass fiber.

8 Claims, No Drawings

(56) References Cited

FOREIGN PATENT DOCUMENTS

| JP | 2009532310 A | 9/2009 |
|---|---|---|
| KR | 1019960003793 B1 | 11/1994 |
| KR | 20040086165 A | 10/2004 |
| WO | 9102705 A1 | 3/1991 |
| WO | 9605147 A1 | 2/1996 |
| WO | 2005024107 A1 | 3/2005 |
| WO | 2011100288 A2 | 8/2011 |

OTHER PUBLICATIONS

International Search Report for PCT/KR2012/010461 dated Mar. 25, 2013.
Office Action dated Nov. 8, 2016 from Japanese Patent Office in connection with the counterpart Japanese patent application No. 2014-549966.

* cited by examiner

GLASS FIBER BOARD COMPRISING INORGANIC BINDER AND METHOD FOR PREPARING THE SAME

TECHNICAL FIELD

The present invention relates to a glass fiber board comprising an inorganic binder, and more particularly, a method for preparing a glass fiber board that may maintain optimal thermal conductivity values with a small amount of inorganic binders, and show high compression and high strength.

BACKGROUND ART

When manufacturing vacuum heat insulation materials, development of a core member for the vacuum heat insulation materials having thermal conductivity performance and having threshold densities and strengths for convenience of the manufacturing process of the vacuum heat insulation materials was also required.

Especially, when manufacturing the core member for the vacuum heat insulation materials, especially since a glass fiber wool cannot but have a high volume from a fiber manufacturing process, density is very low. And thus, when manufacturing the core member for the vacuum heat insulation materials, thermo compression methods were generally used to manufacture boards. Here, since the thermo compression methods indicate methods for adhering glass fiber with each other by applying heat of up to glass deflection temperatures (about 500° C.) of a glass fiber wool, the thermo compression methods have problems of having high energy costs and maintenance costs. Korea publication No. 10-2004-0086165 also discloses a method for applying binders to glass fibers, but it comprises a molded product formed from thermo compression or a core member of vacuum heat insulation materials laminating 2 or more layers of the molded product, thus disclosing only about a thermo press method similar to a thermo compression method and does not solve problems of the thermo compression methods.

DISCLOSURE

Technical Problem

To improve the problems described above, an objective of the present invention is to attempt and apply compression of glass fibers using an inorganic fiber. And more particularly, a method for preparing a glass fiber board maintaining optimal thermal conductivity values with a small amount of inorganic binders and showing high compression and high strength is provided.

Technical Solution

To achieve the objective described above, the present invention provides a glass fiber board comprising a glass fiber and an inorganic binder, wherein the inorganic binder comprises an aluminum phosphate.

To achieve another objective described above, the present invention provides a method for preparing the glass fiber board comprising (a) preparing an inorganic binder solution comprising an aluminum phosphate (b) applying the inorganic binder solution comprising the aluminum phosphate to a glass fiber; (c) compressing the glass fiber to which the inorganic binder solution comprising the aluminum phosphate is applied; and (d) drying the compressed glass fiber.

Advantageous Effects

The present invention, by comprising an aluminum phosphate inorganic binder solution, a glass fiber board maintains optimal thermal conductivity values with a small amount, and shows high compression and high strength. Also, by reducing energy costs and maintenance costs applying a method for preparing the glass fiber board in accordance with the present invention, production efficiency of glass fiber boards may be increased.

BEST MODE

Advantages and features of the present invention, and method for achieving thereof will be apparent with reference to the examples that follow. But, it should be understood that the present invention is not limited to the following examples and may be embodied in different ways, and that the examples are given to provide complete disclosure of the invention and to provide thorough understanding of the invention to those skilled in the art, and the scope of the invention is limited only by the accompanying claims and equivalents thereof. Like components will be denoted by like reference numerals throughout the specification.

Hereinafter, the present invention will be described in detail.

Glass Fiber Board

The present invention provides a glass fiber board comprising a glass fiber and an inorganic binder. The glass fiber comprised in the present invention, may use all of the materials without limitation if used for core materials of vacuum heat insulation materials, but especially, using a standardized glass fiber without air pollution and easily prepared is preferable. For this glass fiber, a glass wool, a ceramic fiber, a rock wool, a glass fiber, an alumina fiber, a silica alumina fiber, a silica fiber, a silicon carbide fiber, etc. may be used. Here, the glass fiber wool may use a glass wool fabric by cutting in a shape of a square, circle, etc. in accordance with a shape of the vacuum heat insulation material.

It is preferable for the glass fiber to have a mean diameter of 4 to 6 μm. When the mean diameter of the glass fiber is less than 4 μm, it falls into a category of a micro fiber and manufacturing costs become very high and may be hazardous to the human body, and when exceeding 6 μm, the number of contact surfaces of the glass fiber itself increase and an initial thermal conductivity may become high. Therefore, a mean diameter of less than 6 μm for the glass fiber is appropriate in aspects of efficiency of preparing the core member for the vacuum heat insulation material comprising an inorganic binder together.

The glass fiber board of the present invention uses an inorganic binder instead of an organic binder, which is impossible to use because degrees of vacuum decrease due to the organic matter volatilizing in a vacuum state, and since strength and compression ratio become excellent when the amount of the inorganic binder comprised in the core member for the vacuum heat insulation material increases, an appropriate density with optimal thermal conductivity may be attained.

The glass fiber board is comprised of materials able to secure excellent long-term durability, and may be used in product forms of a glass fiber board, a sheet, or a paper. Additionally, for materials to improve long-term durability, a fumed silica powder, a silica powder, a pearlite powder, and an aerogel powder may be used, and may be composed by comprising one or more among these.

The glass fiber board described in the present invention comprises a glass fiber and an inorganic binder, and the inorganic binder comprises an aluminum phosphate. Here, the aluminum phosphate is formed as an aluminum precursor and a phosphorus precursor. The aluminum precursor is selected from the group consisting of aluminum hydroxide, aluminum nitrate, aluminum acetate, or aluminum halide, and the phosphorus precursor is selected from the group consisting of phosphate ($H_3PO_4$), monoammonium phosphate ($NH_4H_2PO_4$), diammonium phosphate (($NH_4)_2HPO_4$), triethyl phosphine (($C_2H_5)_3P$), or trimethyl phosphine (($CH_3)_3P$).

Also, by maintaining the particle size of the aluminum precursor in a particle size smaller than prior commercial sol shaped silica and alumina particle shaped inorganic binders, effects of precise binding may be made from polymerization of phosphoric acid.

Therefore, by comprising the precursor with a particle size of 10 nm or less, different from prior aluminum precursors with a particle size of 20 to 50 nm, it may have advantages of attaching to the glass fiber more uniformly. In the case of inorganic binders prepared from the aluminum precursor with prior particle sizes, there are problems of ununiform dispersion of binders from sloshing effects of binders during drying.

The aluminum phosphate formed as the aluminum precursor and the phosphorus precursor composing the inorganic binder of the present invention has, preferably, an atomic ratio of P/Al to be 3~50, and here, the atomic ratio of P/Al indicates a molar ratio of phosphorus and aluminum.

When the atomic ratio of P/Al of the aluminum phosphate is less than 3, solubility of alumina is very low and there are concerns of formation of the aluminum phosphate not being smooth, and when the atomic ratio of P/Al of the aluminum phosphate is more than 50, phosphorous is in excess, and thus strength may be weakened because the surface of the glass fibers are damaged and may show properties of continuously absorbing moisture.

The inorganic binder comprising the aluminum phosphate comprises 0.05 to 10 parts by weight based on 100 parts by weight of the glass fibers. The glass fiber board of the present invention, even though comprising a small amount of the aluminum phosphate inorganic binder, may maintain optimal thermal conductivity values, and thus high strength and highly compressed glass fiber boards may be prepared. When the inorganic binder comprising the aluminum phosphate is less than 0.05 parts by weight based on 100 parts by weight of the glass fibers, there are concerns of the functions of the binder weakening, and when exceeding 10 parts by weight, there are problems in that thermal conductivity becomes high due to increase in density.

The glass fiber board may be a glass fiber board for the core member of the vacuum heat insulation materials. The glass fiber board is a heat insulation material with heat insulating effects, workability, fire resistance, etc., and the glass fiber board may comprise the inorganic binder comprising the glass fibers and the aluminum phosphate, and by being used for the core member of the vacuum heat insulation materials, the core member of the vacuum heat insulation material with excellent initial heat insulation performance and securing long term durability and the vacuum heat insulation material comprising the core member of the vacuum heat insulation material may be provided.

Method Form Preparing a Glass Fiber Board

A method for preparing the glass fiber board in accordance with the present comprises applying an inorganic binder, compressing, and drying.

More particularly, the present invention comprises a method for preparing a glass fiber board comprising the steps of: (a) preparing an inorganic binder solution comprising an aluminum phosphate; (b) applying the inorganic binder solution comprising the aluminum phosphate to a glass fiber; (c) compressing the glass fiber to which the inorganic binder solution comprising the aluminum phosphate is applied; and (d) drying the compressed glass fiber.

In the step (a), an inorganic binder comprising an aluminum phosphate is prepared from reaction of an aluminum precursor and a phosphorus precursor. Here, the aluminum precursor may be selected from the group consisting of aluminum hydroxide, aluminum nitrate, aluminum acetate, or aluminum halide, and the phosphorus precursor may be selected from the group consisting of among phosphate ($H_3PO_4$), monoammonium phosphate ($NH_4H_2PO_4$), diammonium phosphate (($NH_4)_2HPO_4$), triethyl phosphine (($C_2H_5)_3P$), or trimethyl phosphine (($CH_3)_3P$).

It is preferable to use aluminum hydroxide for the aluminum precursor and phosphate for the phosphorus precursor, and since solubility is low when using the aluminum hydroxide for the aluminum precursor, heat-treat at 150° C. or over may be comprised. In the heat-treat step comprised in the preparing an inorganic binder solution step comprising the aluminum phosphate of the present invention, since a heat-treat of 150° C. or over is required, aluminum nitrate or aluminum acetate with high solubility in room temperatures and thus may melt in room temperatures may be further comprised. Here, since there are dangers of a nitric acid gas generating in the case of the aluminum nitrate, using the aluminum acetate is more preferable.

More specifically, in a reaction mechanism of the inorganic binder solution comprising the aluminum phosphate, phosphoric acid ions and aluminum ions, acetate are dissolved in a solution in room temperatures, and oligo-phosphate or poly-phosphate is formed by a polymerization of phosphate at 150° C. or over in the heat-treat process after coating, and may take the role of the binder by forming compounds such as $Al(H_2PO_4)_3$, $AlH_2P_3O_{10}$, $Al(PO_3)_3$, $Al_2P_6O_{18}$, etc. in accordance with changes in temperatures.

In the step (b), when applying the inorganic binder solution on the glass fiber, generally, it is preferable to use a spray method. Generally, the glass fibers exists in a glass fiber wool state, and applying the inorganic binder solution on the glass fiber wool is also possible, but here, for a uniform binder coating, it is preferable to apply the inorganic binder of the present invention in a glass fiber state before the glass fiber wool is formed. This is because, compared to when the glass fibers exist in the glass fiber wool state, it is difficult for the inorganic binders to penetrate inside because volume increases, and a large amount of solvents are needed for a uniform inorganic binder penetration, and in comparison, when applying the inorganic binder solution directly to the glass fibers, the penetration of the binders inside the glass fibers is possible even when using a small amount of solvents.

Especially, when using the inorganic binder comprising the aluminum phosphate, even when adding a small amount using a spray method on a surface of the glass fiber, target strength may be secured, and as a result, thermal conductivity values rising may be prevented beforehand. Here, it is important for the binder to be coated as uniformly as possible on the surface of the glass fiber. In this case, a variety of methods may be attempted according to needs of the preparing process, and when applying the inorganic binders on the glass fiber wool, an excess amount of solvents are required for a uniform binding. Therefore, as described above, applying the inorganic binder when the glass fiber is injected right before the glass fiber wool is formed is convenient in that it may use small amounts of solvents.

In step (c), it is preferable for a compression pressure to be 2.0 to 2.4 $Kg/cm^2$ when compressing the glass fiber. A compression roll, a compression press, etc. may be used for the compression. When the compression pressure is less than 2.0 $Kg/cm^2$, there are concerns of insufficient compression, and when exceeding 2.4 $Kg/cm^2$, there are problems of glass fiber breaking.

Also, in the method for preparing a glass fiber board, a drying temperature in the step (d) is preferably 200 to 400° C. and a drying time is preferably performed for 10 to 20 minutes. When the drying temperature is below 200° C., there are concerns that polyphospate is not sufficiently generated, and when over 400° C., there are problems of high energy costs. Also, when the drying time is less than 10 minutes, there are concerns of insufficient drying, and when exceeding 20 minutes, there are problems of inefficiencies of the production process.

Hereinafter, it is further described in detail through the following examples of the present invention. But the following examples are for illustration of the contents of the invention only, and the scope of the present invention is not limited to the examples.

EXAMPLES

Hereinafter, configurations and effects of the present invention are described in further detail from the following preferred examples. But, the following examples are provided as preferred examples of the present invention and the scope of the present invention is not limited to these.

Contents not presented here may be inferred by those skilled in the arts and its descriptions are skipped.

Example 1

1. Manufacturing an Aluminum Phosphate Inorganic Binder

While stirring 309.5 g of distilled water at 230 rpm, 1,150 g, 85% of phosphate was added in a span of 5 minutes. While stirring the diluted phosphate at 500 rpm, 94.5 kg of aluminium acetate powder was added in a span of 6 minutes and then stirred for 20 minutes, and an aluminum phosphate inorganic binder with an atomic ratio of P/Al of 20 was prepared.

2. Manufacturing a Glass Fiber and a Core Member for a Vacuum Heat Insulation Material A glass fiber having a mean diameter of 4 µm, mass of 50 g was prepared. Also, 2 g of the manufactured aluminum phosphate inorganic binder was put into 200 g of water and stirred to prepare an inorganic binder solution comprising the aluminum phosphate. Here, the inorganic binder solution was applied on the glass fiber, and after compressing at a pressure of 2.0 $kg/cm^2$, it was dried for 20 minutes at 200° C., and cut to a size of 193×253×2 mm (thickness×width×length) to prepare the glass fiber board. Here, a core member for a vacuum heat insulation material was manufactured with 1 piece of the glass fiber board.

Example 2

1. Manufacturing an Aluminum Phosphate Inorganic Binder

While stirring 309.5 g of distilled water at 230 rpm, 1,150 g, 85% of phosphate was added in a span of 5 minutes. While stirring the diluted phosphate at 500 rpm, 94.5 kg of aluminium acetate powder was added in a span of 6 minutes and then stirred for 20 minutes, and an aluminum phosphate inorganic binder with an atomic ratio of P/Al of 20 was prepared.

2. Manufacturing a Glass Fiber and a Core Member for a Vacuum Heat Insulation Material A glass fiber with a mean diameter of 4 µm, mass of 100 g was prepared. Also, 1 g of the manufactured aluminum phosphate inorganic binder was put into 200 g of water and stirred to prepare an inorganic binder solution comprising the aluminum phosphate. Here, the inorganic binder solution was applied on the glass fiber, and after compressing at a pressure of 2.4 $kg/cm^2$, it was dried for 10 minutes at 400° C., and cut to a size of 193×253×2 mm (thickness×width×length) to prepare the glass fiber board. Here, a core member for a vacuum heat insulation material was prepared by laminating 2 pieces of the glass fiber board.

Comparative Example 1

A glass fiber wool of 190×250×50 mm (thickness×width×length), a mean diameter of 6 µm, and a mass of 50 g was prepared. Here, a core member for a vacuum heat insulation material was manufactured by using a thermo compression method forming the glass fiber wool at 500° C.

Comparative Example 2

A core member for a vacuum heat insulation material was manufactured by using a wet process using an organic binder for the glass fiber wool same as the Comparative example 1.

Experimental Example

Measuring Thermal Conductivity of a Vacuum Heat Insulation Material

The core members for the vacuum heat insulation material according to the Examples 1 and 2, and Comparative examples 1 and 2 were manufactured in a size of 25×300×400 mm (thickness×width×length). Next, an outer sealing member formed in a structure of 12 µm of a plyvinylidene chloride (PVDC)/polyethylene terephthalate film (PET), 25 µm of a nylon film, 6 µm of an Al foil, and 50 µm of a linear low density polyethylene (LLDPE) film was formed. And then, 2 g of a getter, which was manufactured by adding 25 g of 95% purity quicklime in a pouch, was inserted in the surface of the prepared core member.

And then, after inserting the core member in a sealing member, it was sealed in a vacuum state of 10 Pa and the vacuum heat insulation material in accordance with the present invention was manufactured.

The vacuum heat insulation material according to the described Examples 1 and 2, and Comparative examples 1 and 2 were aging treated at 70° C. for 14 hours, and then put in a constant temperature chamber of 85° C. and while maintaining for 10 days, thermal conductivity was measured. Here, HC-074•300 (manufactured by EKO Instruments) thermal measurement device was used to measure the thermal conductivity, and the results are as in Table 1.

TABLE 1

|  | Example 1 | Example 2 | Comparative example 1 | Comparative example 2 |
|---|---|---|---|---|
| Thermal conductivity value (mW/mK) | 2.579 | 2.526 | 3.058 | 3.323 |

As can be seen by referring to the Table 1, the thermal conductivity of Comparative examples 1 and 2 being higher than the thermal conductivity of Examples 1 and 2 was observed.

More specifically, the thermo compression method used in the Comparative example 1 is a method adhering the glass fibers with each other by applying heat up to a strain temperature (500° C.) of the glass fiber wool, and not only is the thermal conductivity in the case of Examples 1 and 2, which applies compression of the glass fiber wool using binders, low, but also has excellent effects in aspects of energy and maintenance costs.

Also, in the case of Comparative example 2, which applies compression of the glass fiber wool using the inorganic binders, the thermal conductivity being larger than in the case of Examples 1 and 2, which applies compression of the glass fiber wool using the binders, was identified, and it was identified that an optimal thermal conductivity was maintained in the case of the vacuum heat insulation material applying the glass fiber of the present invention.

Experimental Example

Measuring a Flexural Strength of a Core Member for a Vacuum Heat Insulation Material and an Absorption Ratio of Water A flexural strength and an absorption ratio of water from physical properties of the core member for the vacuum heat insulation material according to the Examples 1 and 2 and Comparative examples 1 and 2 were measured, and its result is as the following Table 2.

Since the flexural strength indicates resistance strength with respect to folding and bending, the flexural strength was compared by folding and bending the vacuum heat insulation material repetitively and measuring the number of times before being severed.

TABLE 1

|  | Example 1 | Example 2 | Comparative example 1 | Comparative example 2 |
|---|---|---|---|---|
| flexural strength (Mpa) | 15 | 17 | 13 | 11 |

Referring to Table 2, in the case of Examples 1 and 2, which comprises an aluminum phosphate inorganic binder, shows a slightly more excellent flexural strength compared to Comparative example 1, which does not comprise binders, and Comparative example 2, which comprises an organic binder, and even though it is not written in the experimental result, absorption ratio of water being also slight lower in the case of Examples 1 and 2 was identified.

Therefore, the glass fiber board in accordance with the present invention, by adding the aluminum phosphate inorganic binder with the glass fiber, secured excellent strength, and the objective of obtaining a high strength glass fiber board by compressing the glass fiber with small amounts of inorganic binders was achieved.

The invention claimed is:

1. A glass fiber board comprising:
   a glass fiber, wherein a mean diameter of the glass fiber ranges from 4 to 6 µm; and
   an aluminum phosphate inorganic binder, wherein the aluminum phosphate inorganic binder is formed with an aluminum precursor and a phosphorus precursor,
      wherein the aluminum precursor comprises aluminum acetate,
      wherein a particle sized of the aluminum precursor ranges from 2 nm to 10 nm, and
      wherein an atomic ratio of P/Al of the aluminum phosphate inorganic binder ranges from 3 to 50,
   wherein the aluminum phosphate inorganic binder is present in an amount ranging from 0.05 to 10 parts by weight, based on 100 parts by weigh of the glass fiber,
   wherein the glass fiber board is prepared by applying the aluminum phosphate inorganic binder to the glass fiber, compressing the glass fiber to which the aluminum phosphate inorganic binder is applied, and drying the compressed glass fiber,
   wherein the glass fiber board is a glass fiber board for a core member of a vacuum heat insulation material.

2. A glass fiber board according to claim 1, wherein
   the aluminum precursor further comprises at least one selected from the group consisting of aluminum hydroxide, aluminum nitrate, and aluminum halide, and
   the phosphorus precursor comprises at least one selected from the group consisting of phosphate, monoammonium phosphate ($NH_4H_2PO_4$), diammonium phosphate (($NH_4)_2HPO_4$), triethyl phosphine (($C_2H_5)_3P$), and trimethyl phosphine (($CH_3)_3P$).

3. A method for preparing a glass fiber board, wherein the glass fiber board is a glass fiber board for a core member of a vacuum heat insulation material, the method comprises:
   (a) preparing an inorganic binder comprising an aluminum phosphate,
      wherein the aluminum phosphate is prepared from an aluminum precursor and a phosphorus precursor,
         wherein the aluminum precursor comprises aluminum acetate,
         wherein a particle size of the aluminum precursor ranges from 2 nm to 10 nm, and
         wherein an atomic ratio of P/Al of the aluminum phosphate ranges from 3 to 50;
   (b) applying the inorganic binder comprising the aluminum phosphate to a glass fiber,
      wherein the glass fiber has a mean diameter ranging from 4 to 6 µm,
      wherein the inorganic binder is present in an amount ranging from 0.05 to 10 parts by weight, based on 100 parts by weigh of the glass fiber;
   (c) compressing the glass fiber to which the inorganic binder comprising the aluminum phosphate is applied;
   (d) drying the compressed glass fiber.

4. A method for preparing a glass fiber board according to claim 3, wherein the step (a) comprises a step to heat-treat at temperatures of 150° C. or over.

5. A method for preparing a glass fiber board according to claim 4, wherein the aluminum precursor further comprises aluminum nitrate.

6. A method for preparing a glass fiber board according to claim 3, wherein the compressing in step (c) is performed with a pressure of 2.0 to 2.4 Kg/cm$^2$.

7. A method for preparing a glass fiber board according to claim 3, wherein the drying in step (d) is performed for 10 to 20 minutes at temperatures of 200 to 400° C.

8. The glass fiber board according to claim 1, wherein the aluminum phosphate inorganic binder consists of the aluminum precursor, the phosphorus precursor, and water.

* * * * *